United States Patent
Hastings, Jr. et al.

(10) Patent No.: US 9,215,008 B2
(45) Date of Patent: Dec. 15, 2015

(54) LOW-LATENCY, HIGH-BANDWIDTH LONG RANGE COMMUNICATION SYSTEM

(71) Applicant: RAYTHEON COMPANY, Waltham, MA (US)

(72) Inventors: C. Thomas Hastings, Jr., Manhattan Beach, CA (US); John F. Silny, Playa Vista, CA (US)

(73) Assignee: RAYTHEON COMPANY, Waltham, MA (US)

(*) Notice: Subject to any disclaimer, the term of this patent is extended or adjusted under 35 U.S.C. 154(b) by 0 days.

(21) Appl. No.: 14/163,341

(22) Filed: Jan. 24, 2014

(65) Prior Publication Data

US 2015/0215039 A1 Jul. 30, 2015

(51) Int. Cl.
*H04B 10/112* (2013.01)
*H04B 7/185* (2006.01)

(52) U.S. Cl.
CPC .......... *H04B 10/112* (2013.01); *H04B 7/18504* (2013.01); *H04B 7/18506* (2013.01)

(58) Field of Classification Search
None
See application file for complete search history.

(56) References Cited

U.S. PATENT DOCUMENTS

| | | | |
|---|---|---|---|
| 5,678,783 A | 10/1997 | Wong | |
| 5,909,299 A | 6/1999 | Sheldon, Jr. et al. | |
| 7,046,934 B2 | 5/2006 | Badesha et al. | |
| 2002/0072361 A1* | 6/2002 | Knoblach et al. | 455/431 |
| 2005/0108374 A1* | 5/2005 | Pierzga et al. | 709/223 |
| 2010/0142482 A1* | 6/2010 | Lu et al. | 370/331 |
| 2013/0175391 A1* | 7/2013 | DeVaul et al. | 244/96 |
| 2013/0177321 A1* | 7/2013 | DeVaul et al. | 398/115 |
| 2013/0177322 A1* | 7/2013 | DeVaul et al. | 398/131 |
| 2013/0179008 A1* | 7/2013 | DeVaul et al. | 701/3 |
| 2013/0242864 A1* | 9/2013 | Vermande et al. | 370/328 |

(Continued)

FOREIGN PATENT DOCUMENTS

| | | | | |
|---|---|---|---|---|
| WO | WO 97/33790 | * | 9/1997 | B64B 1/26 |
| WO | WO 98/35506 | | 8/1998 | |
| WO | WO 01/59961 A1 | | 8/2001 | |

OTHER PUBLICATIONS

Written Opinion of the International Searching Authority for International Application No. PCT/US2014/066440, filed Nov. 19, 2014, Written Opinion of the International Searching Authority mailed Apr. 14, 2015 (6 pgs.).

(Continued)

*Primary Examiner* — Nathan Curs
(74) *Attorney, Agent, or Firm* — Christie, Parker & Hale, LLP

(57) ABSTRACT

A free space line of site communication system for communicating between a first destination and a second destination includes a constellation of airborne platforms in a train-like formation, each travelling at a constant speed and distance relative to each other. Each of the airborne platforms includes: one or more inter-airborne platform optical or RF transceivers for communication with a previous and a next neighboring airborne platforms, wherein each inter-airborne platform transceiver is capable of adjusting its velocity to keep a constant speed and distance relative to its neighboring airborne platforms, and one or more up/down link transceivers for communication with multiple ground sites, each ground site having two or more ground optical or RF transceivers. A first airborne platforms closest to the first destination communicates with the first destination and a second airborne platforms closest to the second destination communicates with the second destination.

11 Claims, 7 Drawing Sheets

(56) References Cited

U.S. PATENT DOCUMENTS

| | | | |
|---|---|---|---|
| 2014/0155093 A1* | 6/2014 | Teller | 455/456.3 |
| 2014/0171075 A1* | 6/2014 | Teller | 455/435.1 |
| 2014/0188377 A1* | 7/2014 | Bonawitz et al. | 701/120 |

OTHER PUBLICATIONS

International Search Report for International Application No. PCT/US2014/066440, filed Nov. 19, 2014, International Search Report dated Apr. 1, 2015 and mailed Apr. 14, 2015 (4 pgs.).

* cited by examiner

LOW-LATENCY, HIGH-BANDWIDTH LONG RANGE COMMUNICATION SYSTEM

FIELD OF THE INVENTION

The present invention relates to optical communication systems and more specifically to a low-latency, high-bandwidth optical communication system.

BACKGROUND

The use of optical communication is ever increasing with a high growth rate in the areas that require a very low data communication latency, such as financial markets.

However, current optical communications include fiber optics as the medium of communication. Since the fibers have a typical refractive index n=1.50, it suffers from latency due to such fiber optic medium. Moreover, the long distance/range optical communication systems are typically laid down under the seas or oceans and thus suffer from external physical interferences, for example, interferences from the ships dragging anchors over such fibers. Furthermore, natural disasters can also disrupt connections, and the ability to rapidly reconfigure a communication network to reconnect the affected areas can be extremely valuable. In addition to the underserved markets, the major global telecom carriers of significant and growing wholesale bandwidth have needs for backup and replacement bandwidth to maintain Quality of Service agreements.

Additionally, space based communication systems suffer from limited bandwidth, high latency (due to long free space ranges), and long deployment time. For example, Geostationary Earth Orbit (GEO) communication satellites have inherently high latency, while other satellite communication networks suffer from some combination of limited worldwide connectivity, low bandwidth, or cost. The GEO satellites offer coverage of a reasonably large fraction of the Earth per satellite but have long communication paths (~36,000 km) resulting in a signal latency of at least 120 msec per path. Moreover, multiple bounces may be required to provide routing, and connection between ground sites not within the footprint of the same satellite may require ground connections. Additionally, GEO communication satellites are currently restricted to Radio Frequency (RF) signals, which limit available bandwidth to a range of hundreds of MHz to a few GHz. Furthermore, multiple beams need to be used to provide relatively high total throughput per satellite (72 beams at 48 Mbps is typical, for 3.4 Gbps per satellite).

Similarly, the Iridium™ constellation simply doesn't have the bandwidth to address the same market. Iridium's™ Low Earth Orbit (LEO) constellation has an altitude of about 780 km, which limits access per satellite. Accordingly, a constellation of 66 active satellites is used to provide 24/7 coverage of the entire world. Use of L-band in LEO constellation limits the bandwidth of satellite phones to less than 1 Mbps. Gateway links offer 10 Mbps of bandwidth to a few selected locations. Moreover, inter-satellite links are RF, with substantially limited bandwidth.

SUMMARY

In some embodiments, the present invention is a low-latency, high-bandwidth optical communication system and method that provides very low temporal latency optical communication with high data bandwidth; and high reliability to meet demanding availability needs.

In some embodiments, the present invention is a free space line of site communication system for communicating between a first destination and a second destination. The communication system includes a constellation of a plurality of airborne platforms in a train-like formation, each travelling at a (nominally) constant speed and distance relative to each other. Each of the plurality of airborne platforms includes: one or more inter-airborne platform optical or radio frequency (RF) transceivers for free space optical or RF communication with a previous and a next neighboring airborne platforms, wherein each inter-airborne platform optical or RF transceiver is capable of adjusting its velocity to keep a constant speed and distance relative to its neighboring airborne platforms, and one or more up/down link transceivers for communication with multiple ground sites, each ground site having two or more ground optical or radio frequency (RF) transceivers. A first airborne platform closest to the first destination communicates with the first destination and a second airborne platform closest to the second destination communicates with the second destination. Also, the number of airborne platforms is a function of the distance between the platforms and the elevation angle from the ground to the first and last airborne platforms in the train.

In some embodiments, one or more additional spare airborne platforms may be added to the constellation of the airborne platforms to improve the reliability and redundancy of the communication system.

In some embodiments, the train-like formation of the airborne platforms is configured to loop between the first destination and the second destination.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

The present invention will now be described more fully with reference to the accompanying drawings, in which exemplary embodiments thereof are shown. The invention may, however, be embodied in many different forms and should not be construed as being limited to the embodiments set forth herein. Rather, these embodiments are provided so that this disclosure is thorough and complete, and will fully convey the concept of the present invention to those skilled in the art.

In some embodiments, the present invention is directed to a low-latency, high-bandwidth optical communication system and method that provides very low temporal latency optical communication with high data bandwidth. The communication is optimized between two geographically diverse points (e.g., two cities, or countries). This way, as an alternative to the typical submarine fiber cable, the communication path provides lower latency and immunity to disruption by ship anchors, nets, biological attacks and environmental dislocation. Some application of the low-latency, high-bandwidth optical communication system include high frequency stock trading between two large domestic trading centers (e.g. Chicago to New York) or international trading centers (cross oceanic such as New York to London)

Figure 1:
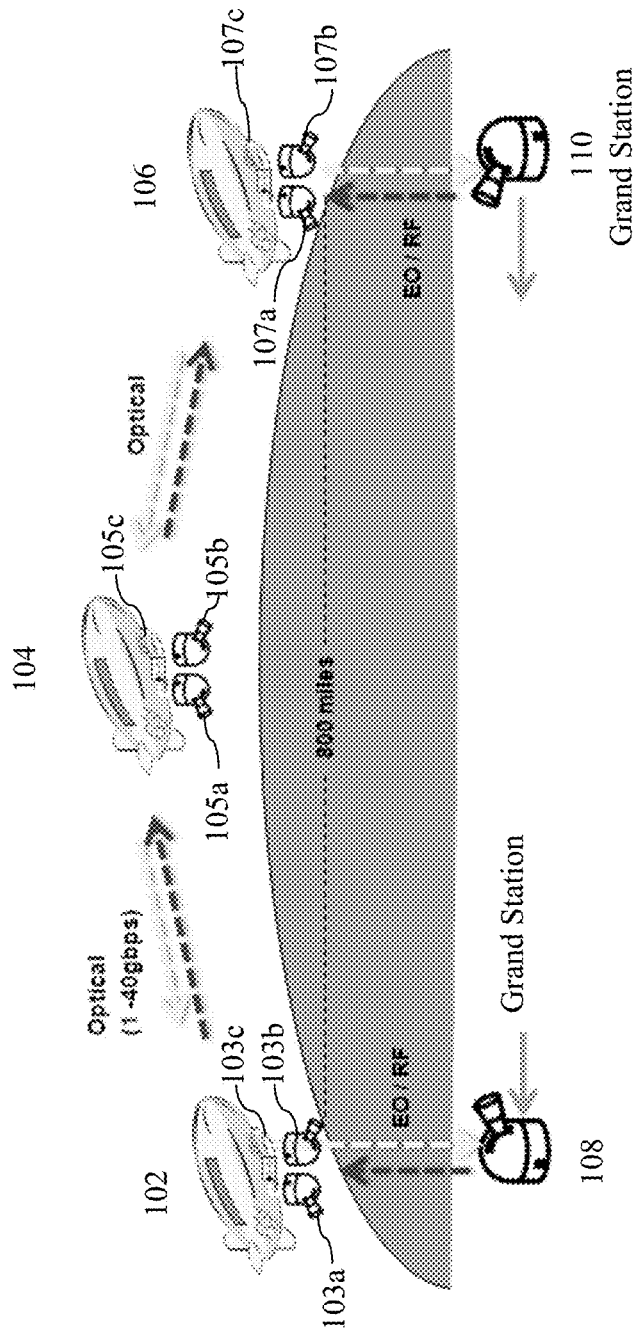
FIG. 1 shows an exemplary constellation of a plurality of airborne platforms (e.g., balloons or aerostats) equipped with optical and/or RF communication systems, according to some embodiments of the present invention.

FIG. 1 shows an exemplary constellation of a plurality of balloons or aerostats equipped with optical and/or radio frequency (RF) communication systems, according to some embodiments of the present invention. As shown, a set of stationary or slowly moving airborne platforms (e.g. balloons, aerostats) are communicatively coupled (and slowly move) together. Each airborne platform is equipped with a communication terminal, for example RF, optical, or tethered electrical for up/down links; and RF or optical for cross-links. Free space propagation between the platforms provides lowest time latency compared to transmission through fiber cable over same length, that is, 1.5× faster based on the refractive index for the free space, as opposed to a typical refractive index of n=1.50 for fiber cables.

Optimized transmission geometries for the constellation provide the shortest distance between cities, in comparison to fiber paths that typically wander to match local geography. Furthermore, system maintainability over distance routes (e.g. across Atlantic ocean) is enabled with continuously moving platform (constellation) train that can loop between ground stations capable of replacing balloon based communication links and backup replacements provide free space connection between long distances at high reliability. The concept of a travelling train of airships reduces the need for ground stations and provides for a recognition of the limited life of airships that could be refurbished or replenished at ground terminal sites on a regular basis.

The exemplary constellation diagram of FIG. 1 depicts three platforms (e.g., balloons) 102, 104 and 106 that may be stationary for shorter routes (i.e., 800 miles, for example between the cities of New York and Chicago) or slowly moving between long cross continent or cross oceanic routes. The number of the platforms may be optimized based on the distance, redundancy and reliability requirements, and other system parameters. Each platform includes at least two free space communication systems (103a, b; 105a, b; and 107a, b), for example, telescopes for optical communication or adjunct radio wave for RF communication; and at least one communication terminal (103c, 105c, 107c) for up/down links with ground stations. As shown, telescope 103a (of the platform 102) is for optical communication with the previous platform (not shown), while telescope 103b (of the platform 102) is for optical communication with the next platform 104. Similarly, telescope 105a (of the platform 104) is for optical communication with the previous platform 102, while telescope 105b (of the platform 104) is for optical communication with the next platform 106, and so on. As the constellation moves, the closest platform (e.g., 102) to the first destination (e.g., city) communicates with a ground station 108 via the communication terminal 103c. Similarly, as the constellation moves, the closest platform (e.g., 106) to the second destination (city) communicates with a ground station 110 via the communication terminal 103c. Each of the ground stations 108 and 110 includes electrical backbone for interface with existing or new ground communication networks. The (ground) communications between the two ground stations 108 and 110 may be encrypted for security of the data.

The free space communication systems on the airborne platforms provide shortest path (straight line) at lowest refractive index (n=1 for free space/air) between the platforms. The RF or tethered electrical communication for up/down-links to/from the ground stations provides high reliability/availability communication without issues of weather or other typical obstructions. The intermediate stations, either stationary or continuously (slowly) moving platform train enables an "always up" system with on-station redundancy and availability over water. Furthermore, the resulting communication system is consistent with the several month lifetime of affordable platforms (airships), for example, the Global Near Space Services (GNSS™) Star Light Stratoship™.

Figure 2:
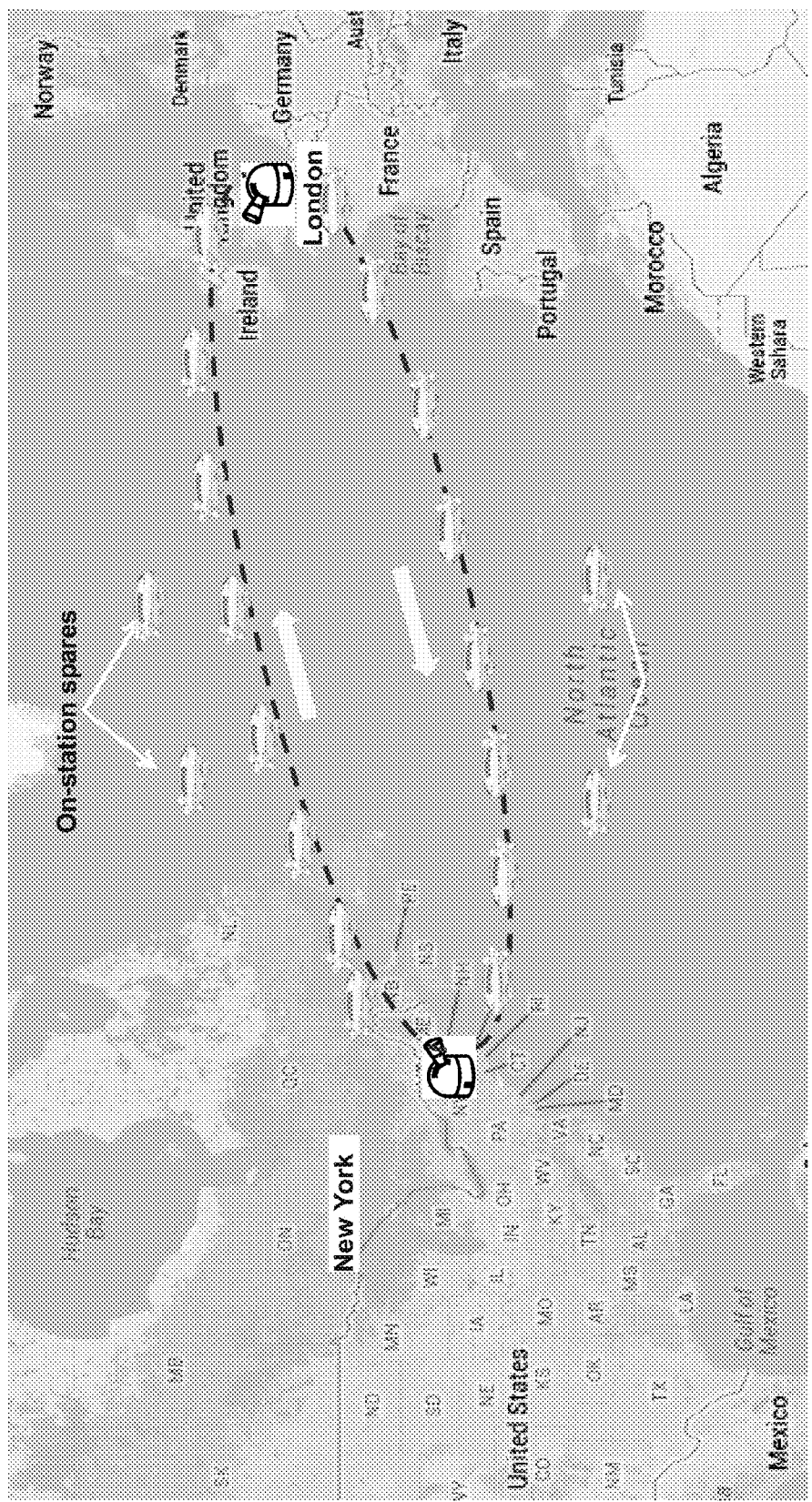
FIG. 2 depicts an exemplary constellation of a plurality of airborne platforms equipped with optical and/or RF communication systems for trans-Atlantic communication, according to some embodiments of the present invention.

FIG. 2 depicts an exemplary constellation of a plurality of airborne platforms equipped with optical and/or RF communication systems for trans-Atlantic communication, according to some embodiments of the present invention. As shown in this example, sixteen airborne platforms are continuously and slowly moving in a loop as a train across the Atlantic ocean between New York and London. Eight platforms are moving as a train from New York to London, and another eight platforms are moving as a train from London to New York to handle line of sight communication at altitude. The two trains, each with bi-directional communication, provide continuous data exchange among themselves and with the two cities. Additionally, a limited number of standby platforms fly alongside the primary trains, ready to replace node outages. In this example, two on-station spare platforms are shown for each direction between the two cities. The spares allow for rapid replacement of a failed airship communication node as opposed to the regular replacement that would occur as a platform arrives at the end terminal of a constellation.

The use of a train of platforms (airships, balloons, aerostats, etc.) with communication payloads that slowly and continuously move between the two cities provides low latency and high bandwidth communication link that stretches across the Atlantic Ocean.

In the two-way platform trains (e.g. from city A to B, and from city B to A), each platform operates for the duration of the transit time and is replaced as its lifetime expires. The use of a system such as GNSS's Star Light Stratoship™ allows the reuse of the communications equipment that are carried on a lower stage solar powered airplane like payload and the replenishment of the depletable helium filled upper stage Stratoship (balloon).

New (replacement) platforms enter queue at one of the starting cities (e.g., New York) and the oldest (obsolete, broken or in need of service) platforms leave queue at one of the ending cities (e.g., London). Platforms are serviced and re-enter queue for transit back, when they are over the ground at one or more designated places. This way, the cost of service or physical access to the platforms is minimized. In this example, the bi-directional transit provides 2× redundancy with high reliability due to the on-station spare platforms for each direction.

In some embodiments, the train velocity is determined by balancing reliability against number of assets. For example, the transit time of an individual airship may be approximately the expected 3 to 4 month lifetime of the airships, or their upper stage balloons.

This Trans-Atlantic train provides a very low latency, high bandwidth, reliable communication system. Given the variability of winds at altitudes above the Jet Stream, airships will require self-propulsion (e.g., solar power). In some embodiments, the system utilizes combination of lower stage propulsion and winds to traverse the routes. For example, the GNSS StarLight Stratoship™ lower stage may be optimized to provide the required propulsion in the 65,000 to 95,000 feet altitude for durations of up to 120 days. That is, an estimate for making a cross Atlantic route in 80 to 120 days. The airship speed can then be adjusted for that journey.

Figure 3:
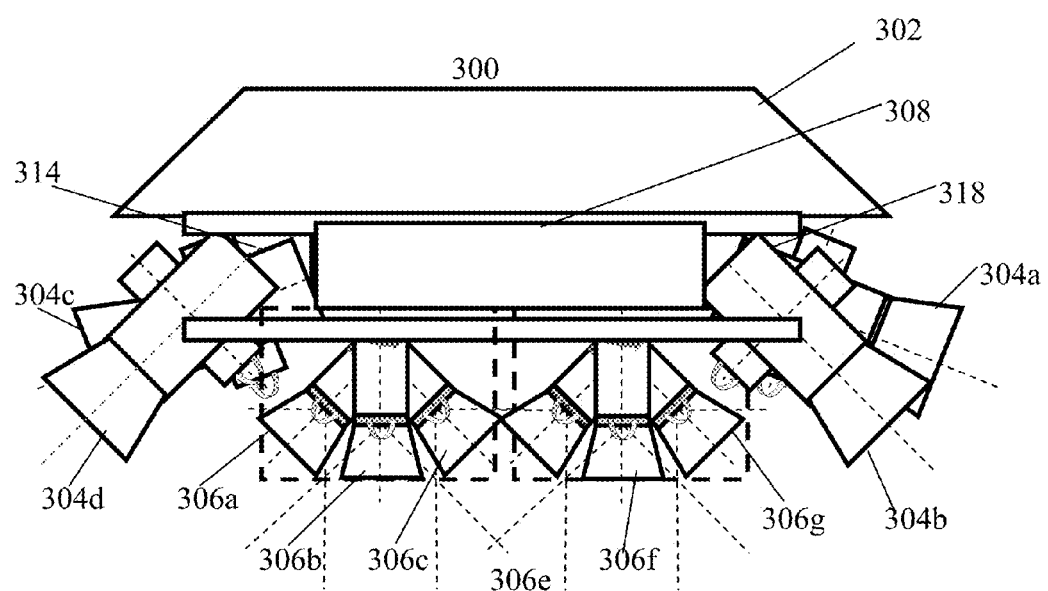
FIG. 3 is an exemplary block diagram of an airborne platform payload including cross link and up/down telescopes, according to some embodiments of the present invention.

FIG. 3 is an exemplary block diagram of an airborne platform payload 300 including cross link and up/down telescopes, according to some embodiments of the present invention. As shown, a plurality of inter-airborne platform (cross link) telescopes or transceivers 304a to 304c (four shown in this exemplary figure) are installed on an exterior portion of each airborne platform for inter-airborne platform optical (or RF) communications. In this example, telescopes or transceivers 304a and 304b are located at the right side of the airborne platform and communicate with one or more of its nearest neighbor airborne platforms on its right side. For example, 304a would point to and communicate with the nearest neighboring airborne platform (i.e., adjacent airborne platform) on that side and 304b would point to and communicate with the next nearest neighboring airborne platform (i.e., two airborne platforms away) on that side. Similarly, telescopes or transceivers 304c and 304d are located at the left side and communicate with one or more of its nearest neighbor airborne platforms on its left side. Each of the cross link telescopes or transceivers are capable of being selectively steered for calibrating the optical (or RF) communication with the neighboring airborne platforms, and/or in the case of a new airborne platform being added to the constellation, for establishing new optical (or RF) communication with the new airborne platform. In some embodiments, the inter-airborne platform optical (or RF) links connect the respective airborne platform in a redundant network.

In some embodiments, the cross link telescopes 304a to 304d include adjustable elevation settings to track the neighboring airborne platforms in the constellation. In some embodiments, one or two nearest neighbors and one or two next-nearest neighbors are utilized for inter-airborne platform communications. Beam steering mirrors used to compensate for host airborne platform jitter and slight orbit differences.

Additionally, there are a plurality of up/down link telescopes or transceivers 306a to 306g (six shown in this exemplary figure) installed on (e.g., exterior of) each airborne platform for ground communication and site diversity. In some embodiments, each up/down link telescope/transceiver supports at least a single high-bandwidth (e.g., 100 Gbps) bi-directional connection between the ground sites. In some embodiments, the up/down link telescopes/transceivers 306a to 306g are gimbaled telescopes or telescopes with coelostats on each airborne platform to track a ground site and establish a high-bandwidth link. In some embodiments, site diversity may be used to reduce outages due to clouds within the line of sight. Electronic or opto-electronic circuit 308 is responsible for filtering, processing, amplifying and/or switching the signals.

Figure 4A:
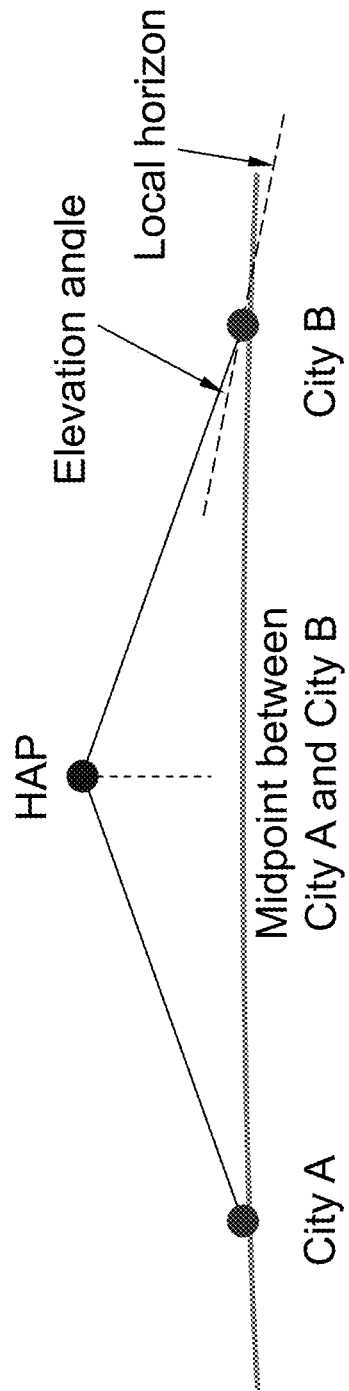
FIG. 4A illustrates an exemplary case in which, there is one symmetric link and one hop, according to some embodiments of the present invention.
Figure 4B:
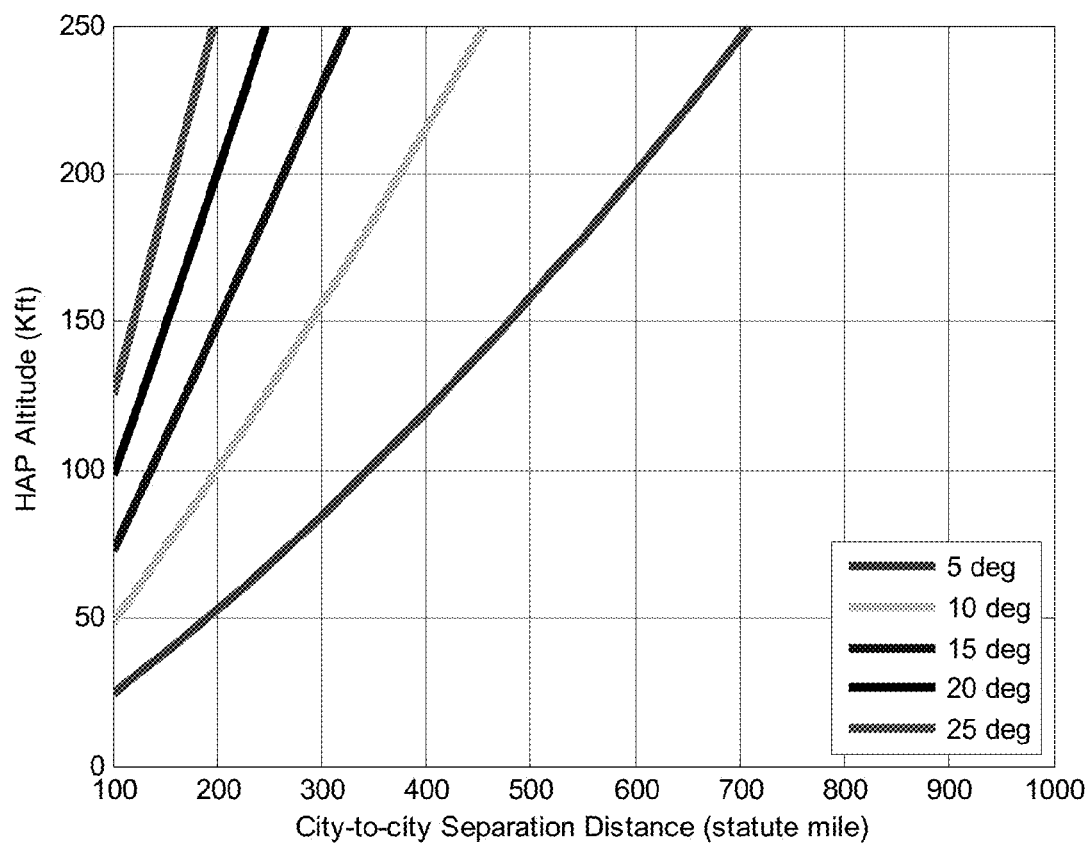
FIG. 4B depicts an exemplary graph for altitude vs. distance separation for the case of FIG. 4A.

FIG. 4A illustrates an exemplary case in which there is one symmetric link and one hop, according to some embodiments of the present invention. As shown, there is only one largely stationary high altitude platform (HAP), which is positioned at approximately midpoint between city A and city B. The curved Earth has a nominal radius of 3,959 miles. It is assumed that the ground stations at city A and city B are located at the sea level, all geometry lies within a plane, and the HAP location bisects the distance between city A and city B. FIG. 4B depicts an exemplary graph for altitude vs. distance separation for the case of FIG. 4A. Five curves, each for a different (increasing) elevation angle (from 5 deg. to 25 deg.) are plotted. Although, for simplicity reasons, only a single airborne platform is shown in FIG. 4A, the invention includes multiple airborne platforms as depicted in FIGS. 1 and 2.

FIG. 4B illustrates the practical considerations in locating an intermediate airship. As elevation angles increase, the distance between city A and B decreases for a fixed airship altitude Practical considerations for airship altitude need to keep the altitude within the confines of available airships (for example, lower than 125 kft, in some cases). In some embodiments, for greatest utility, it is desired to maximize the distance between potential cities distance between cities.

Figure 5A:
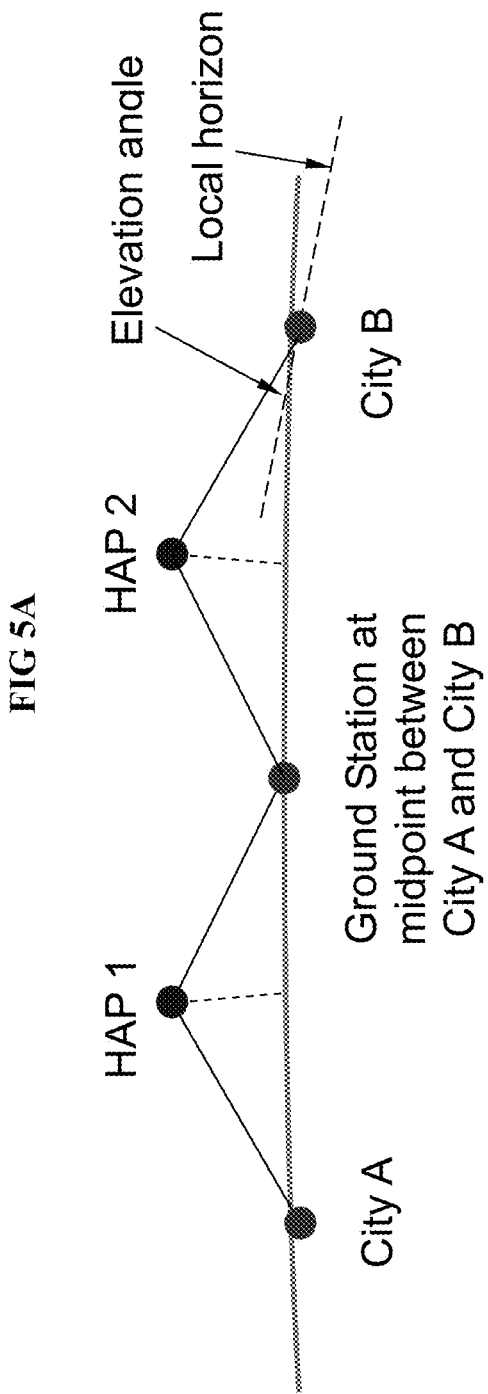
FIG. 5A shows an exemplary method for increasing the range between target cities while maintaining practical airship altitudes by adding intermediate ground stations, according to some embodiments of the present invention.
Figure 5B:
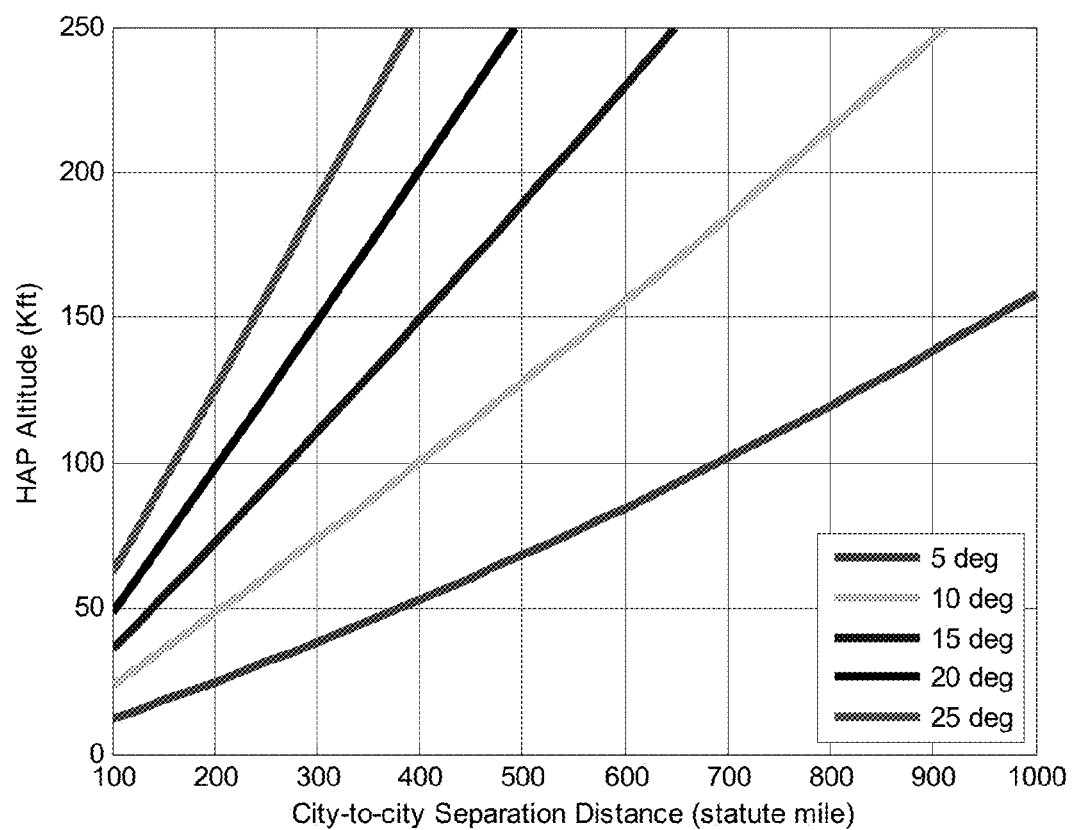
FIG. 5B illustrates an exemplary graph for altitude vs. distance separation for the case of FIG. 5A.

FIG. 5A shows an exemplary method for increasing the range between target cities while maintaining practical airship altitudes by adding intermediate ground stations, according to some embodiments of the present invention. As shown, there are two symmetric links and one hop, that is, two HAPs, HAP1 and HAP2 that have the same altitude. There is a (third) ground station at approximately the midpoint between city A and city B. Again, all geometry lies within a plane, location of the ground station bisects the distance between city A and city B, location of HAP1 bisects the distance between city A and ground station, and location of HAP2 bisects the distance between ground station and city B. FIG. 5B shows an exemplary graph for altitude vs. distance separation for the case of FIG. 5A. Five curves, each for a different (increasing) elevation angle (from 5 deg. to 25 deg.) are plotted. As with the FIGS. 4A and B case, FIGS. 5A and B further demonstrate the limitations on HAP airship altitudes and the practical separation distances between airships and ground stations at reasonable elevation angles.

The charts shown indicate the required airship altitude capabilities required to obtain a reasonable communication system architecture. The architecture utilizes the calculations to economically optimize the number of ground stations and airships required for any particular communication distance required. The calculation quantify what the geometries and altitudes required for airship-to-airship communication, and therefore enable selection of the minimum number of airships between and two cities with a known separation distance. Additional considerations, such as topographical variations and out-of-plane geometries, are accounted for to compute the minimum number of HAPs within a constellation.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A free space line of site communication system for communicating between a first destination and a second destination comprising:
a constellation of a plurality of airborne platforms in a serial formation, each travelling between the first and the second destinations at a substantially constant speed and distance relative to each other, each of the plurality of airborne platforms comprising:
one or more inter-airborne platform optical or radio frequency (RF) transceivers for free space optical or RF communication with a previous and a next neighboring airborne platforms, wherein each inter-airborne platform is capable of adjusting its velocity to keep a substantially constant speed and distance relative to its neighboring airborne platforms, and
one or more up/down link transceivers for communication with multiple ground sites, each ground site having two or more ground optical or RF transceivers,
wherein when a first airborne platform travels to become closest airborne platform to the first destination the first airborne platform starts communicating with the first destination, and when a second airborne platform travels to become closest to the second destination the second airborne platform starts communicating with the second destination, and wherein the number of airborne platforms is a function of the distance between the first destination and the second destination and an elevation angle from the ground at the first destination to a predetermined initial position for the first airborne platform.

2. The communication system of claim 1, further comprising one or more additional spare airborne platforms for reliability and redundancy of the communication system.

3. The communication system of claim 1, wherein the serial formation of the airborne platforms is configured to loop between the first destination and the second destination.

4. The communication system of claim 1, further comprising an intermediate ground site located between the first destination and the second destination to increase the range between the first destination and the second destination, while maintaining a substantially constant altitude for the plurality of airborne platforms.

5. The communication system of claim 1, wherein said one or more of the up/down-link transceivers of a given airborne platform are configured to continuously and in real time track at least two respective ground transceivers of a predetermined ground site.

6. The communication system of claim 1, wherein a velocity of the constellation of the plurality of airborne platforms is a function of the number of airborne platforms.

7. A free space line of site communication system for communicating between a first destination and a second destination comprising:
a constellation of a plurality of airborne platforms in a serial formation, each travelling at a substantially constant speed and distance relative to each other, each of the plurality of airborne platfotnis comprising:
one or more inter-airborne platform optical or radio frequency (RF) transceivers for free space optical or RF communication with a previous and a next neighboring airborne platforms, wherein each inter-airborne platform is capable of adjusting its velocity to keep a substantially constant speed and distance relative to its neighboring airborne platforms, and
one or more up/down link transceivers for communication with multiple ground sites, each ground site having two or more ground optical or RF transceivers,
wherein a first airborne platform closest to the first destination communicates with the first destination and a second airborne platform closest to the second destination communicates with the second destination, and wherein the number of airborne platforms is a function of the distance between the first destination and the second destination and an elevation angle from the ground at the first destination to a predetermined initial position for the first airborne platform, and
wherein as the airborne platform constellation passes a given ground site, one or more of the up/down-link transceivers of a given airborne platform are configured to track at least two respective ground transceivers of the given ground site and send data to a ground transceivers with the clearest line of sight to the given airborne platform.

8. The communication system of claim 7, further comprising one or more additional spare airborne platforms for reliability and redundancy of the communication system.

9. The communication system of claim 7, wherein the serial formation of the airborne platforms is configured to loop between the first destination and the second destination.

10. The communication system of claim 7, further comprising an intermediate ground site located between the first destination and the second destination to increase the range between the first destination and the second destination, while maintaining a substantially constant altitude for the plurality of airborne platforms.

11. The communication system of claim 7, wherein a velocity of the constellation of the plurality of airborne platforms is a function of the number of airborne platforms.

* * * * *